United States Patent Office 2,879,244
Patented Mar. 24, 1959

2,879,244

METHOD OF MAKING DESTATICIZED SYNTHETIC RESIN

Myron A. Coler, New York, N.Y.

No Drawing. Application December 17, 1954
Serial No. 476,052

10 Claims. (Cl. 260—32.6)

This invention relates to destaticized polymer molding compositions and the method of making such compositions.

This application is a continuation in part, of my co-pending application entitled "Process for Making Destaticized Plastic," Serial No. 299,024, filed approximately July 15, 1952.

The term "polymer" as used herein embraces any one of a large and varied group of materials commonly referred to as plastics and synthetic resins, such as polymethyl methacrylate, polyvinylidene chloride, polyethylene, polystyrene, polyvinylchloride, their copolymers and mixtures thereof.

It is common for molded articles made from the above mentioned materials to have electrostatic charges built up on their surfaces upon ejection from the mold. The presence of the charges causes the attraction of dust, lint and other fine debris which render the article unsightly. Invariably, attempts to wipe the article so that it may be displayed for sale results in the generation of additional static charges with resultant dust attraction and scratching of the surface unless specifically treated cloths and extreme care are used.

The need for amelioration of the dust collecting tendencies of articles molded from the polymers mentioned has long been appreciated as evidenced by the extensive literature on the subject.

In general, the approaches of the prior art include the surface treatment of the molded article. A surface coating is inherently undesirable; such a coating is of a temporary nature, and requires an additional handling operation. Such coatings exhibit poor resistance to the wear and tear of everyday use such as washing with soap and water.

Prior attempts to incorporate destaticizing liquids in polymeric molding compositions have been generally directed to liquids soluble in the polymer. Liquids which are soluble become molecularly dispersed and accordingly are not truly effective unless inordinately large quantities are employed. Adverse effects on the properties of the polymer resulting from the inclusion of such large quantities include decreasing the tensile strength and lowering the softening temperature.

It has been discovered that a destaticized polymeric composition may be obtained by incorporating a fluid destaticizing agent having at most a limited solubility in the polymer in a quantity in excess of that so that there is uncombined undissolved destaticizing agent present. The mechanism by which the undissolved fluid is retained is a feature of this invention and is described in greater detail hereinafter.

This invention eliminates treatment of the molded article. The invention provides a means of incorporating a destaticizing material into a molding material so efficiently that an extremely small proportion of liquid in the composition can produce a destaticized molded article. The use of a small proportion of fluid avoids introducing undesired changes in the physical properties of the polymer. Further, it has been found that the product of this invention retains antistatic properties for long periods despite washing with soap and water.

Accordingly, it is an object of this invention to provide a process for making polymers which are substantially non-susceptible to the accumulation of electrostatic charges.

Still another object is to provide a process for making a static dissipating polymeric molding composition.

A still different object is to provide a simple low cost method of producing static dissipating polymeric plastic molded articles.

It is an object of this invention to provide a polymeric molding composition for injection molding articles having antistatic properties.

A particular object of this invention is to provide a process for producing destaticized polymers of polymerizable organic monomers.

Still further objects and advantages of this invention are made apparent by the following description.

There is disclosed, in copending applications of Myron A. Coler and Arnold S. Louis for "Destaticized Polymeric Molding Compositions," Serial Number 476,051, filed concurrently herewith, and "Non-Electrostatic Plastic Articles and Method of Making Same," Serial Number 295,838, filed June 26, 1952, that by treating certain finely divided carrier materials with appropriate fluid destaticizing materials, the treated carrier materials may be mixed with comminuted polymer particles and molded to produce static dissipating articles. The resulting article will have a surprisingly high conductivity in relation to the amount of destaticizing material incorporated therein; and thus by this technique it is possible to produce molded products having relatively good static charge dissipation properties but structural properties substantially the same as those of the untreated resin. The molding powder which results may be formed by conventional molding techniques into any of various desired solid void free shapes.

Whereas, in carrying out the inventions described in the referenced applications selected liquids and carriers are added to already polymerized plastic powder or granules, this invention permits the sorption of the destaticizing agent on a carrier for the agent prior to or during the polymerization process.

In particular, it is contemplated that the invention be carried out during the polymerization from the liquid to the solid state. In the case of certain materials which are normally polymerized in one stage from gas to solid, the present invention may be employed by interrupting the polymerization at a liquid stage, incorporating the destaticizing fluid and carrier and completing the polymerization. As disclosed herein, this invention is considered to be particularly applicable to the "mass method" of polymerization. Further, this invention may be applied to direct polymerization processes such as casting.

In the present application phrases such as "finely divided materials" are not intended to carry any implication as to the manner in which the fine state of subdivision is arrived at.

The term "sorption" as used herein is intended to embrace absorption, adsorption and other processes by which a solid material and a fluid co-adhere.

An important feature which distinguishes the products of this invention from polymers containing plasticizers and other compatible agents is that the plasticizers, etc. are dissolved in the polymer. On the contrary, it is essential to the carrying out of the applicant's inventions that the destaticizing agent be present in an amount exceeding that soluble in the polymer, or, preferably, that the destaticizing agent be totally insoluble in the polymer.

Consider the situation wherein the destaticizing agent is dissolved and the carrier is suspended in the monomer at the inception of a mass polymerization reaction. As the polymerization proceeds, the destaticizing agent becomes insoluble in the polymer and is bound to the surface of the carrier by sorption. Accordingly, the destaticizing agent is neither entrapped by the polymer nor expressed from it during molding but is available to perform its function.

It may be advantageous to treat the carrier materials with destaticizing liquid prior to their introduction into the polymerization system, otherwise competition between other liquids present and the destaticizing liquid may result, to the disadvantage of the destaticizing liquid.

In my copending application for "Anti-Static Plastic Products and Method of Making Same," Serial Number 299,201, filed July 15, 1952, it is taught that the carrier may have a surface coating of a gel material so as to further bind the destaticizing liquid to the carrier.

It is recognized that the addition of the various materials mentioned hereinafter can have a significant effect on the rate or course of the polymerization reaction and that the addition agents must be chosen with due regard for the requirements of the particular reaction system in question.

On the other hand, it should be remembered, as is well known in the art, that such influences can often be corrected by the addition of positive or negative catalysts or by other changes in reaction conditions as the case may require.

From the listings of otherwise suitable destaticizing materials, given hereafter, one familiar with a given polymerization process can select combinations that would be non-interfering with the polymerization.

As disclosed in the referenced copending applications, suitable carrier materials are those solids having the ability to hold considerable quantities of fluid destaticizing material under conditions of molding. A sorption factor in excess of 0.5, as hereinafter defined, is regarded as a minimum requirement. They may be organic or inorganic and should have a large specific surface which may reside, in part, in extensive internal pores, such as occur in diatomaceous earth. Generally, finely divided carrier materials are preferred for their greater surface as compared to an equivalent quantity of coarser material. They should be stable under molding conditions, substantially non-reactive with the destaticizing agent or plastic, and insoluble in both. The carrier material should be readily wetted by the destaticizing agent.

Some carrier materials may serve a dual purpose; for example, they may also serve as coloring pigments. Specifically, titanium dioxide, copper phthalocyanine, cadmium reds and yellows, chrome yellow and other white and colored materials in pigment form may, for example, be used. Diatomaceous earth is particularly useful as a carrier material for translucent destaticizing agents if a translucent anti-static plastic is desired. Other suitable materials include bentonite, clay, and alumina hydrate. Wood floor, alpha cellulose, asbestos fibers and like finely divided filler materials can likewise serve as carrier materials within the intent of this application. It should be noted that as normally compounded (e.g., by extrusion and chopping) in filled plastics, i.e., those containing such fillers, the fillers are encapsulated and therefore are not in a condition to receive the liquid destaticizing material. In fact, as distinctly pointed out hereinafter, care must be exercised in carrying out this invention to avoid encapsulating the carrier before the destaticizing agent has been bound to the carrier surface by sorption.

It has been determined that the carrier must have at least a minimum capacity for sorption of the destaticizing material. This property may be conveniently determined by modification of the well-known oil absorption test as follows:

15 grams of carrier are placed in a 600 cc. Ehrlenmeyer flask. Fluid (preferably the destaticizing material of interest) is added in small measured quantities with intensive shaking until just sufficient fluid has been added to collect the carrier into a single ball-like mass. The sorption factor, S, is the ratio of the volume of fluid to the volume of carrier in the ball-like mass. Expressed in more readily measurable parameters, $S = DL/C$ where L is the volume of liquid added, C is the weight and D is the absolute density of the carrier material used, all expressed in consistent units.

It has been found that suitable carrier materials are those having a sorption factor of at least 0.5.

Preferred destaticizing materials are those which are liquid, or may be readily liquified, such as certain waxes, are electrically conductive, are non-reacting with the polymer or carrier material, are stable under molding conditions, and have low vapor pressure so as to minimize loss during molding as well as from the molded article. It is important that the destaticizing material be substantially insoluble in the polymer and/or the carrier, and, in turn, be substantially free of solvent properties for the same materials. If the destaticizing agent is partly soluble in the polymer, then an amount in excess of that which is soluble need be employed so that in effect, there is present a quantity of undissolved destaticizing agent.

Thus taking the specific case of polystyrene and polyethylene glycol having a molecular weight of 400, it has been determined by the commonly used film transparency test that the polystyrene dissolves 2% of its volume of the polyethylene glycol. If 5% of the polyethylene glycol is employed with polystyrene in making a composition of this invention then 2% will be dissolved in the polystyrene leaving only 3% available as a destaticizing agent. The importance of the carrier to prevent this 3% of polyethylene glycol from being expressed may be appreciated.

The minimum quantity of destaticizing agent that may be employed is therefore in part a function of its solubility in the particular polymer, the preferred ranges that are stated hereinafter are in terms of the undissolved agent present.

A simple film test comprises casting thin films of the composition containing various measured amounts of additives and determining at which concentration the film becomes optically hazy.

We have found it is important to use organic liquids of high dielectric constant. Specifically, if the dielectric constant is greater than 25, substantially all of the advantageous properties herein described are secured in full measure. If the dielectric constant is less than 25, the advantages of this invention are not secured.

The aforementioned value of dielectric constant may be determined by first balancing a given capacitor of open plate construction against a calibrated variable standard capacitor using a current whose frequency is 10,000 cycles per second to determine its initial capacity. The same capacitor is then immersed in the liquid of unknown dielectric constant and again balanced against the standard, the resistive component of the dielectric fluid being at the same time balanced out by means of a calibrated variable resistor connected in parallel with the standard capacitor. The ratio of the latter measured capacity to the initial capacity of the capacitor is taken to be the dielectric constant of the fluid in question. The test capacitor must, of course, be cleaned scrupulously before each measurement.

Types of destaticizing agents which have been found to be particularly useful in the practice of this invention include the amides, nitriles, salts of quaternary ammonium compounds and polyhydric alcohols. In general, the effectiveness of the active groups just mentioned decreases with the increasing size of attached alkyl or aryl radicals. The criterion of dielectric constant previously mentioned is preferred, however, as defining those substances which may be used to advantage as destaticizing agents for the purposes of this invention.

The liquid should have a relatively low vapor pressure, otherwise the destaticizing material will evaporate during storage, particularly at high temperature and its beneficial effects will be lost. Thus, water answers the criterion of dielectric constant set up herein for the selection of conductive materials, but it has been found that moldings containing solely water as destaticizing material lose their static dissipating properties after a few days' storage at 113° F., presumably because of evaporation of the water. For a given destaticizing fluid, permanence will depend upon vapor pressure and heat of vaporization at working temperatures among other things. The permanence of a particular destaticizing fluid as incorporated in a particular plastic may be readily determined by experiment.

Furthermore, destaticizing materials having too low a boiling point may have a tendency to evolve gas or form bubbles during extrusion or injection molding operations.

It has been found that the destaticizing fluid should have a boiling point of at least 190° C. in order that the composition should have reasonably permanent destaticizing properties and be reasonably free of objectionable gas evolution during molding or extrusion operations.

It should be understood that many fluids which have high dielectric constants are inherently non-conductive but are rendered conductive by the presence of small amounts of ionizable materials. Usually such ionizable substances are present as normal impurities in the commercially available forms of the fluids. Ionizable impurities may also be derived from the polymeric plastic or carrier particles which are used or by absorption from the air.

Throughout the specifications and claims of this application, whenever fluid destaticizing materials are mentioned, the commonly available technical grade of these materials is intended. In using grades of greater purity, containing an adequate amount of ionizable material, the deficiency can, if necessary, be eliminated by deliberate addition of such ionizable material.

As is brought out by the various examples provided hereinafter, the quantity of destaticizing liquid employed may be reduced if there are incorporated additional agent which contribute ions to the destaticizing liquid. These agents include ionizable materials such as formamide, acetamide, salts including lithium bromide, salts of chelate compounds and hydroxides and salts of quaternary ammonium compounds.

If the destaticizing agent is highly conductive or rendered so by the introduction of highly ionizable materials then as little as 1 part by volume undissolved agent based on 100 parts by volume of the plastic may be employed with satisfactory results.

On the other hand, destaticizing agents which are only moderately conductive and contain little ionizable material must be used in larger quantities, 3 parts by volume or more.

Thus, unmodified polyethylene glycol having a molecular weight of approximately 1500 should be added in an amount exceeding 5 parts by volume of a destaticized plastic composition based on the volume of the polystyrene. Since the polyethylene glycol is soluble to the extent of about 2 parts in the polystyrene, there are about 3 parts of the destaticizing agent undissolved and available to perform its nominal function.

However, if a 10% by weight solution of lithium bromide in the same polyethylene glycol is used as the destaticizing agent, 3 parts by volume of this solution based on the weight of polystyrene employed will render a polystyrene molding composition antistatic. In this latter case only 1 part by volume of the polyethylene glycol is undissolved and available as the destaticizing agent. Thus while we have stated the minimum quantities of destaticizing agent which are to be employed we prefer to use at least 2 parts by volume in addition to the minimum quantity in order to obtain products of enhanced antistatic properties.

In both of the above described examples it is assumed that a suitable quantity of carrier is employed as hereinafter described.

If a totally insoluble and highly conductive agent is employed then only 1% total agent need be employed.

It should be observed that an organic liquid of low or moderate dielectric constant can be upgraded by the incorporation of water or other liquid of high dielectric constant. The dielectric constant criterion for a suitable destaticizing liquid given above is to be applied to such combinations in their entirety.

We have also found hydrotropic agents helpful in incorporating aqueous systems in organic destaticizing liquids. Such agents include sodium xylene sulfonate and toluene sulfonic acid.

Wetting agents such as the sodium salt of sulfated long chain fatty alcohol or sodium naphthenate may be utilized to improve wetting of the carrier, particularly those materials having fine internal openings.

The proper amount of carrier to be employed for a given quantity of destaticizing material is a function of the sorption factor which is readily determined by the modification of the well-known oil absorption test given earlier.

If insufficient carrier is used for the quantity of destaticizing liquid then the resulting molding will be objectionably wet or its physical properties may even be impaired.

It has been experimentally determined that no more than a certain volume ratio of destaticizing agent to carrier may be employed if the advantages of this invention are to be obtained. In order to avoid moldings having a wet feeling this maximum ratio has been determined to be 1.2 times the sorption factor. By way of illustration the following example is provided.

10 cc. of finely divided silica, marketed under the trademark "Santocel C" were mixed with sufficient quantity of a given liquid to form a single ball-like mass in accordance with the standard oil absorption test. The quantity of liquid necessary was found to be 116 cc. Therefore the sorption factor was $116/10$ or 11.6.

Accordingly the maximum volume ratio of destaticizing liquid to carrier for this particular combination is found to be 11.6 x 1.2 or 13.9 cc. of liquid per cc. of carrier. To state the matter conversely, no more than .072 cc. of carrier per cc. of destaticizing liquid may be employed in this particular case. On the other hand the maximum amount of carrier to be employed is governed by its effect on the properties of the molded article.

The maximum amount of carrier, destaticizing agent or other additives employed should be not more than 50% of the total volume of the molding composition.

In order to clearly illustrate the instant invention the following examples are provided. For purposes of convenience quantities are referred to in the examples in units of weight although elsewhere preference has been to percentage by volume.

Example 1

A solution was prepared which comprises:

| | Parts by weight |
|---|---|
| Benzoyl peroxide | 0.2 |
| Styrene monomer | 87.6 |
| Polyethylene glycol [1] | 8.6 |
| Total | 96.4 |

[1] Average molecular weight approximately 1540, dielectric constant above 50, density 1.15.

To the solution was added 3.6 parts by weight of a finely divided silica having an average particle size of 3–5 microns such as "Santocel C" manufactured by Monsanto Chemical Co., St. Louis, Mo.

The mixture was heated at 90° C., for approximately 12 hours with agitation. By this time the polymer was sufficiently viscous to support the silica without settling. Agitation was then discontinued while the temperature was maintained at 90° for a total of 24 hours.

The temperature was then raised to 120° C. and maintained for an additional 24 hours.

The composition was then mechanically broken up into molding granules.

The product was molded into discs approximately 2" in diameter and ¼" thick by means of a Van Dorn injection molding press.

The molded disc was then rubbed vigorously with a wool cloth. The disc was then held approximately ¼" above a pile of cigarette ashes. No pickup of ash was noted which fact evidences that the molding was destaticized and hence incapable of supporting electrostatic charges.

*Example 2*

Observing the procedure of Example 1 the following composition was prepared:

| | Parts by weight |
|---|---|
| Magnesium carbonate (minus 325 mesh) | 7.2 |
| Styrene monomer | 89.0 |
| Benzoyl peroxide | 0.2 |
| Polyethylene glycol [1] | 8.6 |
| Total | 105.0 |

[1] As in Example 1.

The resulting product was tested in accordance with the prescribed procedure and found to be static dissipating.

*Example 3*

Observing the procedure of Example 1 the following composition was prepared:

| | Parts by weight |
|---|---|
| N-acetyl ethanolamine | 7.5 |
| "Santocel C" (silica) | 3.0 |
| Styrene monomer | 89.3 |
| Benzoyl peroxide | 0.2 |
| Total | 100.0 |

The resulting product was tested in accordance with the described procedure and found to be static dissipating.

*Example 4*

Observing the procedure of Example 1 the following composition was prepared:

| | Parts by weight |
|---|---|
| N-acetyl ethanolamine | 1.7 |
| Polyethylene glycol | 6.8 |
| Styrene monomer | 89.0 |
| Benzoyl peroxide | 0.2 |
| "Santocel C" (silica) | 3.6 |
| Total | 101.3 |

The resulting product was tested in accordance with the described procedure and found to be static dissipating.

*Example 5*

A composition was prepared which comprised:

| | Parts by weight |
|---|---|
| Benzoyl peroxide | 0.2 |
| Styrene monomer | 70.0 |
| Methyl methacrylate monomer | 17.6 |
| Polyethylene glycol | 8.6 |
| "Santocel C" (silica) | 3.6 |
| | 100.0 |

The mixture was heated at 90° C., for approximately 12 hours, with agitation until the polymer was sufficiently viscous to support the silica.

Agitation was then discontinued while the temperature was maintained at 90° for a total of 12 hours.

The temperature was then raised to 120° C. and maintained for an additional 12 hours.

*Example 6*

Example 1 was repeated using methyl methacrylate in place of the styrene. The processing times were reduced to one-half that used for the styrene.

The resulting product, tested the same way, was found to be static dissipating.

*Example 7*

Example 1 was repeated using formamide in place of the polyethylene glycol.

The resultant product was satisfactory with respect to destaticization. The molding characteristics were marginal in that gassing occurred in the supply chamber of the injection molding press. This example illustrates the behavior of a destaticizing liquid which approaches the upper limit of volatility or the lower limit of boiling point.

*Example 8*

Example 1 was repeated with polyethylene glycol having an average molecular weight of 400 substituted for the higher molecular weight material. The results were substantially the same as in Example 1.

*Example 9*

Example 8 was repeated with 10% of the polyethylene glycol replaced with acetamide.

The resultant product had improved destaticization properites in that the rate of leak-off of an induced charge as measured with an electrostatic voltmeter was greater in the case of the molding of Example 9 than in the case of the moldings of Example 8.

*Example 10*

Example 8 was repeated with 10% of the polyethylene glycol replaced with lithium bromide.

The resulting product showed improved destaticizing characteristics, as did those of Example 9.

*Example 11*

The procedure of Example 9 was repeated except that alkyl dimethyl (dimethyl-benzyl) ammonium chloride wherein the alkyl group has 8 to 18 carbon atoms was substituted for the acetamide. Results were substantially as in Example 9.

*Example 12*

The procedure of Example 9 was repeated except that stearamido-propyl dimethyl β-hydroxy-ethyl ammonium phosphate was substituted for the acetamide. Results were substantially as in Example 9.

*Example 13*

Example 10 was repeated with polyethylene glycol having an average molecular weight of approximately 6000 substituted for the polyethylene glycol having an average molecular weight of 400.

The product when tested was found to be destaticized.

*Example 14*

A solution having the following composition was prepared:

| | Parts by weight |
|---|---|
| Methyl methacrylate polymer | 13.5 |
| Methyl methacrylate monomer | 77.2 |
| Benzoyl peroxide | 0.2 |
| Polyethylene glycol (av. mol. wt. 1500) | 5.5 |
| | 96.4 |
| "Santocel C" (silica) (added with agitation) | 3.6 |
| Total | 100.0 |

The mixture was introduced into a ½" diameter x 12" long glass tube. The tube was then sealed. The mass was heated at 40° C. for 48 hours and then the temperature was increased to 90° C. for four hours.

The resulting polymerized product was tested in accordance with the procedure of Example 1 and found to have satisfactory antistatic properties.

*Example 15*

Example 12 was repeated using the following composition:

| | Parts by weight |
|---|---|
| Styrene polymer | 13.5 |
| Styrene monomer | 77.2 |
| Benzoyl peroxide | 0.2 |
| Polyethylene glycol (av. mol. wt. 1500) | 5.5 |
| "Santocel C" (silica) | 3.6 |
| Total | 100.0 |

The resulting product exhibited satisfactory destaticizing properties.

After thorough mixing the composition was cast into a mold and heated at 110° C. for 12 hours. The resulting product had excellent anti-static properties.

*Example 16*

3 parts by weight of polyethylene glycol having an average molecular weight of 400, 3 parts by weight of a 35% water solution of stearamidopropyl dimethyl β-hydroxyethyl ammonium phosphate were thoroughly mixed and the whole dried at 180° F. for 12 hours. The dried, treated carrier was suspended in a solution comprising 80 parts by weight of styrene monomer, 10 parts by weight of polystyrene and 0.2 parts by weight of benzoyl peroxide.

Polymerization and testing were carried out as in Example 1. The resultant moldings were thoroughly static dissipating.

*Example 17*

Example 16 was repeated with the polyethylene glycol omitted. The resulting product was found to be marginally static dissipating.

*Example 18*

Example 16 was repeated except that 4 parts by weight of a 25% water solution of alkyl dimethyl (dimethylbenzyl) ammonium chloride wherein the alkyl group has from 8 to 18 carbon atoms was substituted for the solution of stearamidopropyl dimethyl β-hydroxyethyl ammonium phosphate. Results were substantially as in Example 16.

For the sake of convenience quantities have been expressed in terms of weight. Generalized limits are, however, more logically expressed in volume percent as has been done herein. Weight limits for a particular combination of materials can be readily calculated from the generalized volume limits and densities of the materials in question.

In the light of the above examples certain important process restrictions will now be pointed out, some by way of repetition.

It is essential that the organic destaticizing fluid be substantially insoluble in the polymers and that where some slight solubility exists, the quantity of destaticizing liquid used exceeds the quantity soluble in the polymer. The required amounts of destaticizing fluid which shall be undissolved in the polymer are fully described hereinabove.

The destaticizing fluid may or may not be soluble in the monomer. When the destaticizing fluid is soluble in the monomer it may be incorporated in the molding composition of this invention with substantially equal effectiveness by pretreating the carrier with the destaticizing liquid and adding the treated carrier to the polymerization system or by adding the carrier and the destaticizing liquid separately to the polymerization system. When the destaticizing fluid is insoluble in the monomer it is preferred that it be incorporated by treating the carrier with the polymerizing fluid prior to adding the carrier to the polymerization system. If the carrier and an insoluble destaticizing fluid are to be separately added to a monomer it is essential that the destaticizing fluid be colloidally dispersed in the monomer.

Many embodiments may be made of the present invention, within the scope of the appended claims as evidenced by the many examples provided of which Example 1 represents the best mode presently contemplated for carrying out this invention. Accordingly, it is to be understood that the foregoing description is to be interpreted as illustrative only and not in a limiting sense.

I claim:

1. The method of producing a destaticized synthetic resin which comprises polymerizing an ethylenic monomer in the presence of an additive comprising a liquid organic compound having a dielectric constant greater than 25 and a boiling point greater than 190° C., sorbed onto carrier particles having a particle size smaller than 44 microns and a sorption factor greater than 0.5 and insoluble in said organic compound and said monomer; the ratio of said organic compound to said carrier particles being in the range of 0.2 to 1.2 times said sorption factor; said monomer, said organic compound and said carrier particles being mutually non-reactive and stable during polymerization and said organic compound and said carrier particles being mutually non-reactive and stable under normal molding conditions for said resin.

2. The method of producing a destaticized synthetic resin which comprises polymerizing a monomeric material selected from the group consisting of styrene, halogenated styrene, methyl methacrylate, halogenated methyl methacrylate, ethylene, and vinylidene chloride in the presence of an additive comprising a liquid organic compound having a dielectric constant greater than 25 and a boiling point greater than 190° C., said organic compound being sorbed onto carrier particles having a particle size smaller than 44 microns and a sorption factor greater than 0.5 and insoluble in said organic compound and said monomeric material; the ratio of said organic compound to said carrier particles being in the range of 0.2 to 1.2 times said sorption factor; said monomeric material, said organic compound and said carrier particles being mutually non-reactive and stable during polymerization and said organic compound and said carrier particles being mutually non-reactive and stable under normal molding conditions for said resin.

3. The method of producing a destaticized synthetic resin which comprises polymerizing a monomeric material selected from the group consisting of styrene, halogenated styrene, methyl methacrylate, halogenated methyl methacrylate, ethylene, and vinylidene chloride in the presence of an additive comprising (1) a liquid organic compound having a dielectric constant greater than 25 and a boiling point greater than 190° C., and (2) a minor proportion of an ionized organic material dissolved in said organic compound, said organic compound being sorbed onto carrier particles having a particle size smaller than 44 microns and a sorption factor greater than 0.5 and insoluble in said organic compound and said monomeric material; the ratio of said organic compound to said carrier particles being in the range of 0.2 to 1.2 times said sorption factor; said monomeric material, said organic compound, said ionized organic material, and said carrier particles being mutually non-reactive during polymerization and said organic compound, said ionized organic material, and said carrier particles being mutually non-reactive and stable under normal molding conditions for said resin.

4. The method of producing a destaticized synthetic resin which comprises polymerizing a monomeric material selected from the group consisting of styrene, halogenated styrene, methyl methacrylate, halogenated methyl methacrylate, ethylene, and vinylidene chloride in the presence of an additive comprising (1) a liquid organic compound having a dielectric constant greater than 25 and a boiling point greater than 190° C., and (2) a minor proportion of N-acetyl ethanolamine dissolved in said organic compound, said organic compound being sorbed onto carrier particles having a particle size smaller than 44 microns and a sorption factor greater than 0.5 and insoluble in said organic compound and monomeric material; the ratio of said organic compound to said carrier particles being in the range of 0.2 to 1.2 times said sorption factor; said monomeric material, said organic compound, said N-acetyl ethanolamine and said carrier particles being mutually non-reactive and stable during polymerization and said organic compound, said N-acetyl ethanolamine and said carrier particles being mutually non-reactive and stable under normal molding conditions for said resin.

5. The method of producing a destaticized synthetic resin which comprises polymerizing a monomeric material selected from the group consisting of styrene, halogenated styrene, methyl methacrylate, halogenated methyl methacrylate, ethylene, and vinylidene chloride and in the presence of polyethylene glycol sorbed onto carrier particles having a particle size smaller than 44 microns and a sorption factor greater than 0.5 and insoluble in said polyethylene glycol and said monomeric material; the ratio of said polyethylene glycol to said carrier particles being in the range of 0.2 to 1.2 times said sorption factor; said monomer, said polyethylene glycol, and said carrier particles being mutually non-reactive and stable during polymerization and said polyethylene glycol and said carrier particles being mutually non-reactive and stable under normal molding conditions for said resin.

6. The method of producing a destaticized polystyrene which comprises polymerizing styrene monomer in the presence of an additive comprising a liquid organic compound having a dielectric constant greater than 25 and a boiling point greater than 190° C., sorbed onto carrier particles having a particle size smaller than 44 microns and a sorption factor greater than 0.5 and insoluble in said organic compound, and said monomer; the ratio of said organic compound to said carrier particle being in the range of 0.2 to 1.2 times said sorption factor; said styrene, said organic compound and said carrier particles being mutually non-reactive and stable during polymerization and said organic compound and said carrier particles being mutually non-reactive and stable under normal molding conditions for said resin.

7. The method of producing a destaticized polystyrene which comprises polymerizing styrene monomer in the presence of at least 3 parts of polyethylene glycol per 100 parts of styrene, said polyethylene glycol being sorbed onto carrier particles having a particle size smaller than 44 microns and a sorption factor greater than 0.5 and insoluble in said polyethylene glycol and said styrene; the ratio of said polyethylene glycol to said carrier particles being in the range of 0.2 to 1.2 times said sorption factor; said styrene, said polyethylene glycol and said carrier particles being mutually non-reactive and stable during polymerization and said polyethylene glycol and said carrier particles being mutually non-reactive and stable under normal molding conditions for polystyrene.

8. The method of producing a destaticized polystyrene which comprises polymerizing styrene in the presence of at least 3 parts of polyethylene glycol per 100 parts of styrene, said polyethylene glycol being sorbed onto particles of silica having a particle size smaller than 44 microns, the ratio of said polyethylene glycol to said silica being in the range of 0.2 to 1.2 times the sorption factor of said silica.

9. The method of producing a destaticized polystyrene which comprises polymerizing styrene in the presence of at least 3 parts of polyethylene glycol per 100 parts of styrene and a minor proportion of an ionized organic material dissolved in said polyethylene glycol, said polyethylene glycol being sorbed onto particles of silica, having a particle size smaller than 44 microns, the ratio of said polyethylene glycol to said silica being in the range of 0.2 to 1.2 times the sorption factor of said silica.

10. The method of producing a destaticized polystyrene which comprises polymerizing styrene in the presence of at least 3 parts of polyethylene glycol per 100 parts of styrene and a minor proportion of N-acetyl ethanolamine dissolved in said polyethylene glycol, said polyethylene glycol being sorbed onto particles of silica having a particle size smaller than 44 microns, the ratio of said polyethylene glycol to said silica being in the range of 0.2 to 1.2 times the sorption factor of said silica.

References Cited in the file of this patent
UNITED STATES PATENTS

| | | |
|---|---|---|
| 2,467,341 | Seymour | Apr. 12, 1949 |
| 2,579,375 | Eisen | Dec. 18, 1951 |
| 2,624,725 | Bjorksten et al. | Jan. 6, 1953 |
| 2,692,863 | Iler | Oct. 26, 1954 |